(12) United States Patent
Lau et al.

(10) Patent No.: US 6,853,492 B1
(45) Date of Patent: Feb. 8, 2005

(54) CONDUCTIVE LENS

(75) Inventors: Lee Seng Lau, Kedah (MY); Boon Leong Yeap, Penang (MY); Woai Sheng Chow, Pinang (MY)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/694,916

(22) Filed: Oct. 27, 2003

(51) Int. Cl.$^7$ .............................................. G02B 3/00
(52) U.S. Cl. .................................................... 359/649
(58) Field of Search ................................ 359/360, 443, 359/448–451, 453, 459, 649

(56) References Cited

U.S. PATENT DOCUMENTS 6,433,913 B1 * 8/2002 Bauer et al. ................ 359/265
6,577,358 B1 * 6/2003 Arakawa et al. ............. 349/57

* cited by examiner

Primary Examiner—Scott J. Sugarman
Assistant Examiner—M. Hasan

(57) ABSTRACT

A method and system for a conductive lens. In one method embodiment, the present invention forms a silver flash layer on a lens. A polyester sheet is then applied over the silver flash layer. Openings are utilized in the polyester sheet to expose an edge portion of the silver flash layer. A conductive bus layer is then applied around the edges of the lens, the conductive bus providing an electrical coupling between the silver flash layer and the conductive bus. In so doing, a lens that is visually transparent but electromagnetic interference (EMI) opaque is formed.

23 Claims, 4 Drawing Sheets

CONDUCTIVE LENS

FIELD OF THE INVENTION

The present claimed invention relates to the field of lenses. Specifically, the present claimed invention relates to a conductive lens.

BACKGROUND ART

Many devices use display screens to present information to a user. Some of the display screens are liquid crystal displays (LCD's) or the like, which are easily scratched, damaged, or tampered with. For example, an automatic teller machine (ATM) may be accessed by hundreds of users each day. During one or more of the accesses, the display screen on the ATM may be poked, touched, scratched, or worse, and that is just an ATM. In another example, a device having a display screen may be a mobile device which is transported from location to location. Such a mobile device has the opportunity to be dropped, fumbled, bumped, other objects falling onto it, or the like. Therefore, in both cases (e.g., device is stationary or mobile), there is a need to protect the display screen from the harsh effects of both accidental wear-and-tear as well as malicious behavior.

Therefore, most display screens utilize a protective lens cover for the display screen which protects the screen against most blunt or sharp trauma damages. For example, a cover may allow an object up to a predetermined weight to be dropped on the display without incurring major damage. Additionally, the display screen cover may protect a mobile device from damage if it is dropped from a certain height.

However, in addition to damage caused to the display screen, there is also a matter of damage caused by the display screen (or the components operating thereunder). For example, if a user is operating a device having a display screen in an electronic environment, or an environment with restrictions related to electromagnetic fields, it is important that any electromagnetic interference (EMI) emitted by the display screen, or the components operating thereunder, be blocked. For example, if an electronic device having a display screen is used by a laboratory (or bomb squad, or radio tower, or aircraft, or vehicle, or patient with a pacemaker, or the like) the effects of electricity or electric fields caused by EMI leakage from the instrument may incur serious errors or repercussions.

Therefore, a need exists for a display cover which protects the underlying display from damage while also reducing the EMI output from the screen or the underlying components.

SUMMARY OF INVENTION

The present invention provides, in various embodiments, a method and system for a conductive lens. In one method embodiment, the present invention forms a silver flash layer on a lens. A polyester sheet is then applied over the silver flash layer. Openings are utilized in the polyester sheet to expose an edge portion of the silver flash layer. A conductive bus layer is then applied around the edges of the lens, the conductive bus providing an electrical coupling between the silver flash layer and the conductive bus. In so doing, a lens that is visually transparent but electromagnetic interference (EMI) opaque is formed.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail as not to unnecessarily obscure aspects of the present invention.

Figure 1:
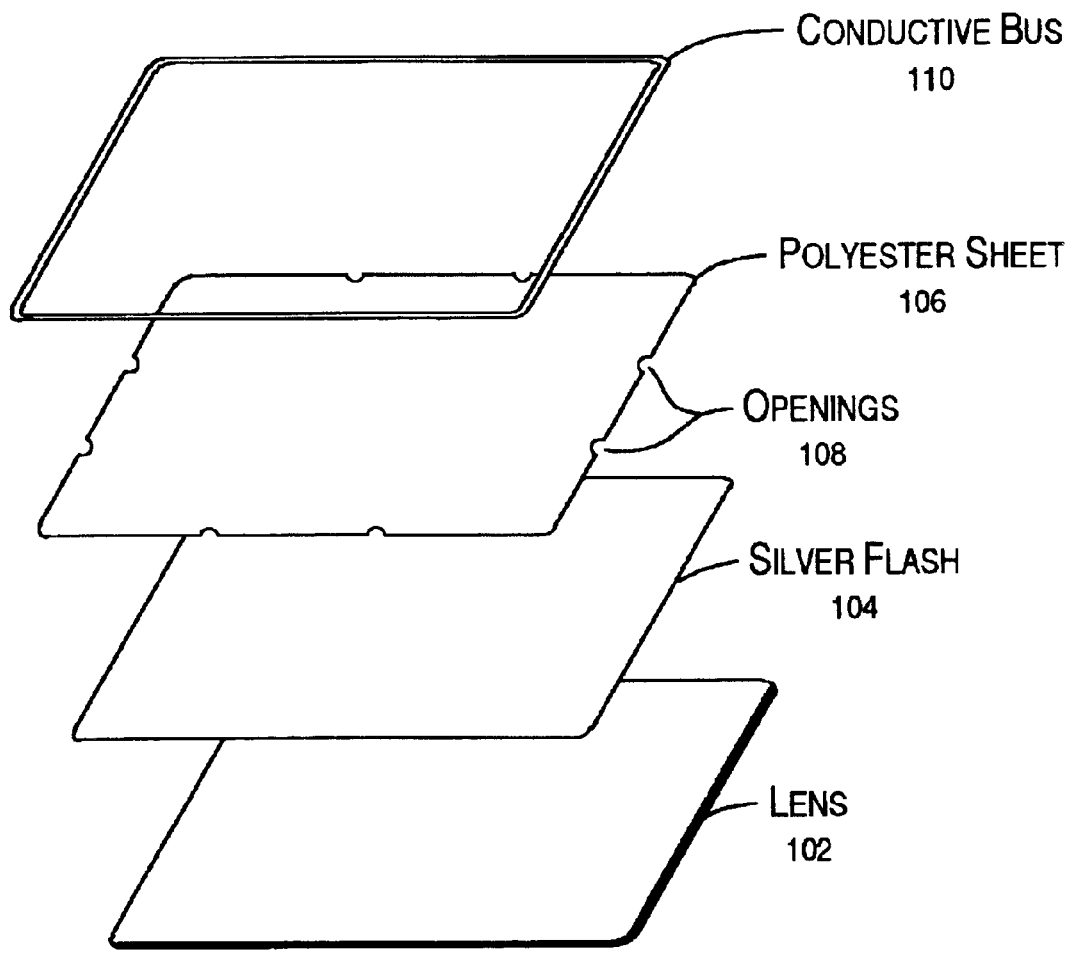
FIG. 1 is a perspective view of an exemplary conductive lens assembly in accordance with one embodiment of the present claimed invention.

With reference now to FIG. 1, a perspective view of an exemplary conductive lens assembly 100 is shown. The following discussion will begin with a detailed description of the physical characteristics of the present conductive lens assembly 100. The discussion will then contain a detailed description of the use and operation of the present conductive lens assembly 100. Referring now to the physical characteristics of the present conductive lens assembly 100, in one embodiment, conductive lens assembly 100 includes a lens 102. In one embodiment, lens 102 is a polycarbonate lens which is used to provide a layer of protection for a display screen (e.g., an LCD). For example, lens 102 has a greater damage, scratch, or tamper resistance in comparison to an LCD display screen. In addition, lens 102 may be much less expensive than the display screen it is protecting. Therefore, if serious damage does occur to the lens 102, replacement of the lens 102 will be much less cost prohibitive than replacement of the display screen. Although a polycarbonate lens is used in one embodiment, the lens 102 may be a plastic or glass optical lens.

Conductive lens assembly 100 also includes a silver flash layer 104. In one embodiment, silver flash layer 104 is transparent. Silver flash layer 104 is also conductive. Therefore, when silver flash layer 104 is formed on lens 102, the lens becomes conductive. In one embodiment, the silver flash layer 104 is applied to the inner surface of the lens 102 with any of the plurality of methods of silver flash application, which are well known in the art.

With reference still to FIG. 1, conductive lens assembly 100 also includes a polyester sheet 106. In general, polyester sheet 106 may be any clear plastic sheet capable of being a hermetic barrier. In one embodiment, polyester sheet 106 is a polyester laminate. In one embodiment, polyester sheet 106 has a thickness of 3 to 5 millimeters. Although a specific thickness is stated herein, polyester sheet 106 may be thicker or thinner depending on the hermetic seal requirements. In general, polyester sheet 106 is applied over silver flash layer 104 with the use of an adhesive. In general, the adhesive may be any adhesive capable of holding the polyester sheet 106 to the silver flash layer 104. In one embodiment, the adhesive is a high temperature adhesive capable of withstanding 70 degrees Celsius. and 95 percent humidity for 16 hours. Polyester sheet 106 is used to provide a hermetic seal over silver flash layer 104 such that oxidation of silver flash layer 104 does not occur.

Conductive lens assembly 100 also includes openings formed in the polyester sheet 106. In one embodiment, the openings 108 are formed prior to applying polyester sheet 106 over the silver flash layer 104. In another embodiment, the openings 108 are formed after applying polyester sheet 106 over the silver flash layer 104. In one embodiment, there are pluralities of openings 108 on each side of polyester sheet 106. The openings 108 may also be holes in the polyester sheet 106 which are not notches (e.g., openings set back from the edge of the polyester sheet 106). In yet another embodiment, the polyester sheet 106 is smaller than the dimensions of the lens 102 and the openings are formed because the smaller polyester sheet 106 leaves a gap around the edges of the lens 102.

Referring still to FIG. 1, conductive lens assembly 100 also includes a conductive bus 110. In general, conductive bus 110 is a conductive ink (e.g., carbon ink). In one embodiment, conductive bus 110 is a silver ink screen printed onto the conductive lens assembly 100. Conductive bus 110 is applied around the edges of the conductive lens assembly 100. Conductive bus 110 may be applied by any means well known in the art (e.g., airbrush, spray on, or the like). In one embodiment, conductive bus 110 is placed up to 5 millimeters from the edge of the conductive lens assembly 100. Although 5 millimeters is mentioned herein, the conductive bus 110 may be placed any distance from the edge of the conductive lens assembly 100 up to the viewing window opening.

Figure 2:
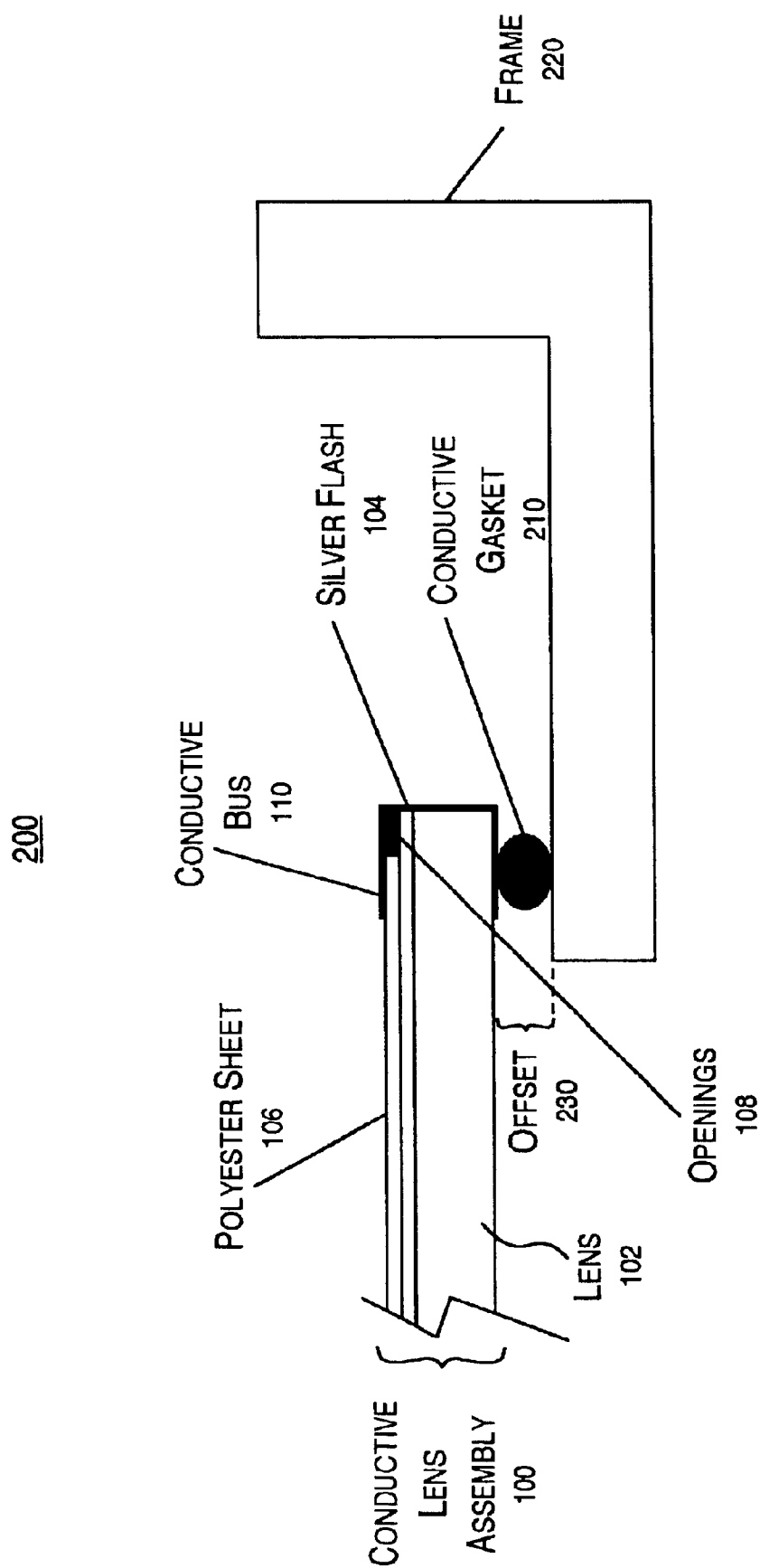
FIG. 2 is a side view of a portion of an exemplary installed conductive lens assembly in accordance with one embodiment of the present claimed invention.

With reference now to FIG. 2, a side view of a portion of an exemplary installed conductive lens assembly is shown. For purposes of clarity, only a portion of the complete installed conductive lens assembly and frame 220 are shown. In general, FIG. 2 includes conductive lens assembly 100, a conductive gasket 210, and frame 220. The frame 220 may be any substance which may be used as a front panel of a device. In one embodiment, it is an aluminum diecast. In another embodiment, it may be steel, aluminum, titanium, chrome, polymer, plastic, ceramic, or the like which may be cast, pressed, formed, or the like, that provides protection to the device and/or EMI shielding.

The conductive gasket 210 is used to provide a full electrical conductive path between the frame 220 and the conductive bus 110. In general, the conductive gasket 210 may be any compressible conductive medium (e.g., metal spring contact fingers, conductive mesh, or the like) which are well known to one in the art. As described herein, the electrical conductive path is ultimately utilized to electrically couple the frame 220 with the silver flash layer 104 coating on the conductive lens assembly 100. When the electric path is completed, the conductive lens assembly 100 becomes opaque with regards to electromagnetic interference (EMI). In addition, the offset 230 in between the conductive lens assembly 100 and the frame 220 covered by the conductive gasket 210 is also EMI shielded.

Figure 3:
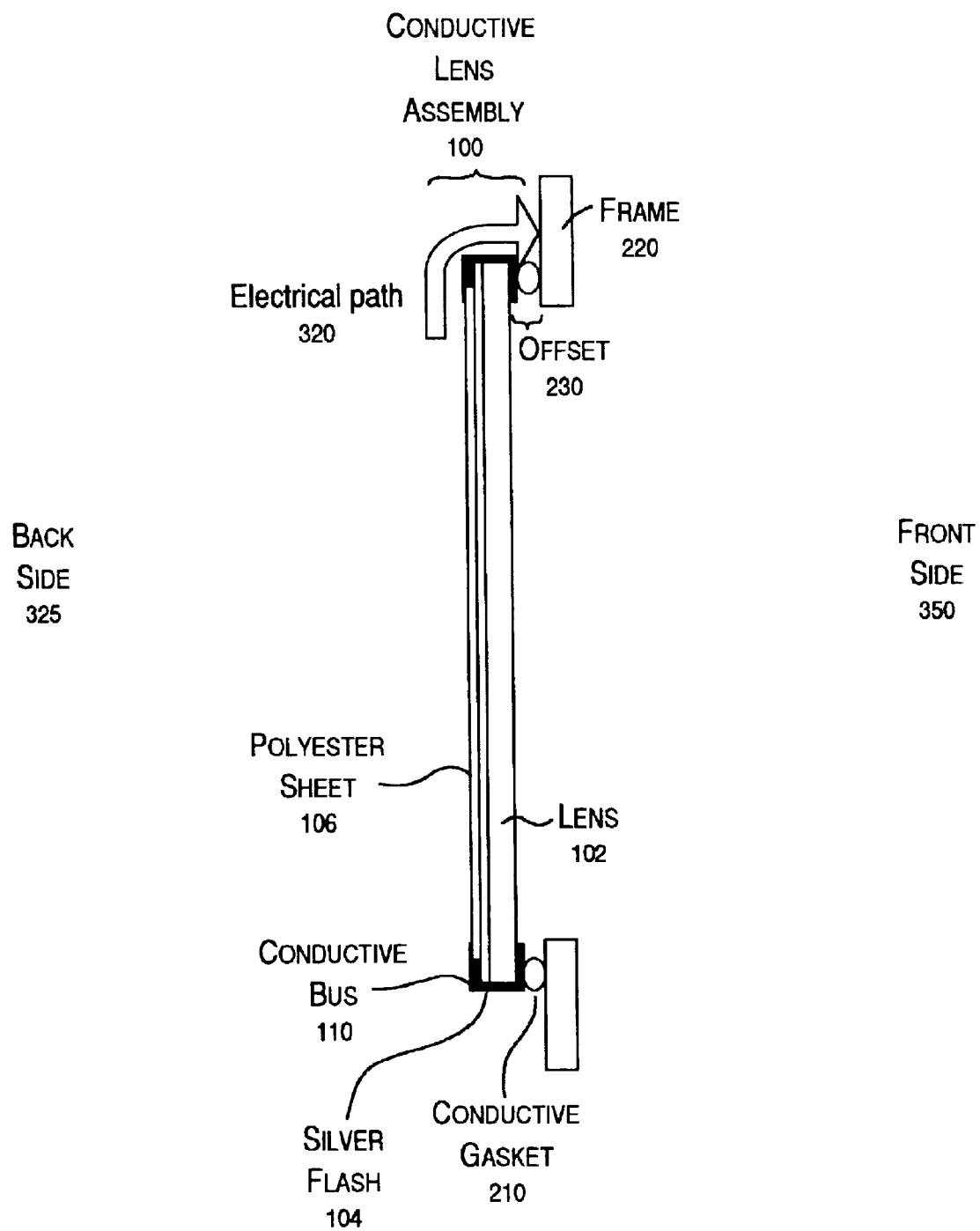
FIG. 3 is a side view of an exemplary installed conductive lens assembly in accordance with one embodiment of the present claimed invention.

With reference now to FIG. 3, a side view of an exemplary installed conductive lens assembly is shown. In one embodiment, completed assembly 300 shows a complete side view of an exemplary conductive lens assembly 100 installed in a frame 220. Specifically, FIG. 3 shows the correct orientation of the conductive lens assembly 100. That is, the outside of the lens faces front side 350 and the inside of the lens is toward backside 325. For example, a user viewing the lens would look from front side 350 toward backside 325. Therefore, the user would look through the lens in the order: polycarbonate lens 102, silver flash layer 104, and polyester sheet 106. In addition, the route of the electrical path 320 is shown as it flows through the conductive lens assembly 100 through the conductive gasket 210 and through frame 220 thereby providing complete EMI protection.

Figure 4:
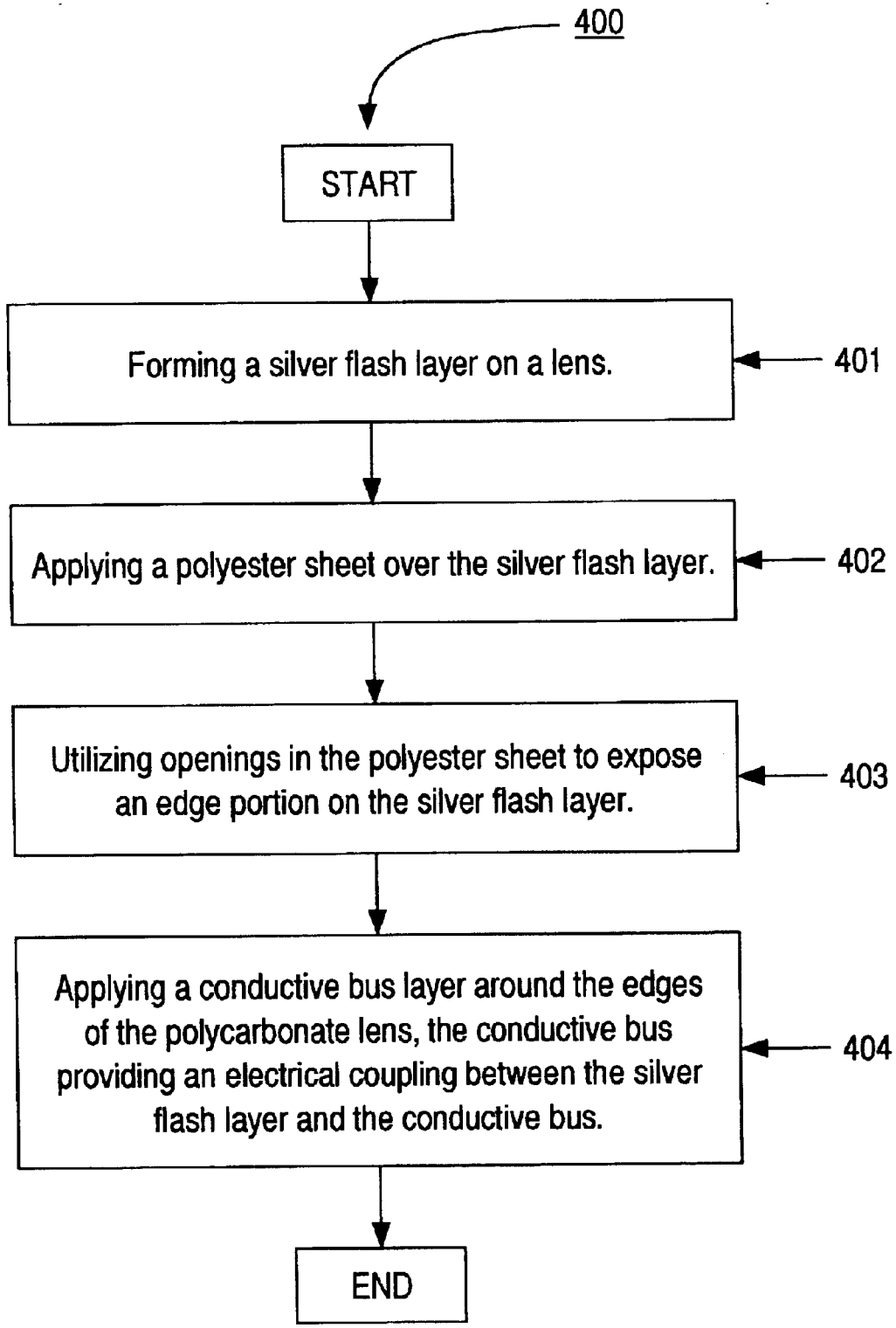
FIG. 4 is a flowchart of steps in an exemplary method for an EMI opaque visually transparent conductive lens in accordance with one embodiment of the present invention.

With reference now to FIG. 4 and to FIG. 1, a flow chart 400 summarizing the steps performed in accordance with one embodiment of the present invention is shown. At step 401, in one embodiment a silver flash layer 104 is formed on a lens 102. As stated herein, the silver flash layer 104 is transparent to the eye. However, when the silver flash layer 104 is electrically charged, the silver flash layer 104 becomes opaque to EMI (e.g., an EMI shield). The silver flash layer 104 may be formed via a plurality of methods well known in the art.

With reference now to step 402 of FIG. 4 and to FIG. 1, in one embodiment, a polyester sheet 106 is applied over the silver flash layer 104. In one embodiment, the polyester sheet 106 is a polyester laminate. The polyester sheet 106 provides a hermetic seal over silver flash layer 104 thereby reducing the effects of the environment (e.g., oxidation, rubbing, scratching, etc.) on the silver flash layer 104. As described herein, the polyester sheet 106 may be applied using a plurality of methods well known in the art. For example, the polyester sheet 106 may be applied using an adhesive. In one embodiment, the adhesive is a high temperature adhesive capable of withstanding an environment of 70 degree Celsius., 95 percent humidity for 16 hours. In one embodiment, the polyester sheet 106 is 3 to 5 millimeters thick.

With reference now to step 403 of FIG. 4 and to FIG. 1, in one embodiment, openings 108 in the polyester sheet 106 are used to expose an edge portion of the silver flash layer 104. As described herein, in one embodiment the openings 108 are rectangular. In another embodiment, the openings 108 may be any geometric shape (e.g., circular, semi-circular, square, octagonal, or the like.) In one embodiment, the openings 108 in the polyester sheet 106 are formed prior to applying the polyester sheet 106 over the silver flash layer 104. In another embodiment, the openings 108 in the polyester sheet 106 are formed after applying the polyester sheet 106 over the silver flash layer 104.

With reference now to step 404 of FIG. 4 and to FIG. 1, in one embodiment, a conductive bus layer 110 is applied around the edges of the lens 102 providing an electrical coupling between the silver flash layer 104 and the conductive bus 110. In one embodiment, the conductive bus 110 is a printed on silver screen ink. In another embodiment, the conductive bus 110 is formed by any of a plurality of methods well known in the art. The utilization of the conductive bus 110 forms a complete conductive lens assembly 100. Then, as described herein, a conductive gasket 210 of FIG. 2 is used for electrically coupling the conductive lens assembly 100 with a frame 220 thereby providing an EMI shield. In so doing, a protective lens which provides damage protection (e.g., drop, scratch, tamper, etc.) for the display and also provides EMI shielding, while maintaining optical transparency, is formed.

Thus, the present invention provides a conductive lens method and apparatus which provides an EMI opaque visually transparent conductive lens. The present invention also provides a conductive lens method and apparatus which achieves the above accomplishment and which protects a display from damage due to scratching, tampering, or the like. The present invention further provides a conductive lens method and apparatus which achieves the above accomplishment and which can be adapted to readily interface with industry standard components and meet industry standard specifications.

The foregoing descriptions of specific embodiments of the present invention have been presented for purposes of illustration and description. They are not intended to be exhaustive or to limit the invention to the precise forms disclosed, and modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for a conductive lens comprising:
   forming a silver flash layer on a lens;
   applying a polyester sheet over said silver flash layer;
   utilizing openings that extend through said polyester sheet to expose an edge portion of said silver flash layer; and
   applying a conductive bus layer around the edges of said lens, said conductive bus layer providing an electrical coupling between said silver flash layer and said conductive bus layer through said openings.

2. The method as recited in claim 1 further comprising:
   utilizing a conductive gasket for electrically coupling said lens with a metal frame, said electrical coupling producing an electromagnetic interference (EMI) shield.

3. The method as recited in claim 1 wherein said openings in said polyester sheet are formed prior to applying said polyester sheet over said silver flash layer.

4. The method as recited in claim 1 wherein said polyester sheet is applied over said silver flash layer with a high temperature adhesive which tolerates temperatures up to 70° C.

5. The method as recited in claim 1 wherein said polyester sheet provides a hermetic seal for said silver flash layer.

6. The method as recited in claim 1 wherein said conductive bus layer is a printed on silver ink screen.

7. The method as recited in claim 1 wherein said openings in said polyester sheet are rectangular.

8. The method as recited in claim 1 wherein said openings in said polyester sheet are circular.

9. The method as recited in claim 1 wherein said polyester sheet is 3 to 5 millimeters thick.

10. A conductive lens comprising:
    a lens;
    a silver flash layer on said lens;
    a polyester sheet over said silver flash layer, said polyester sheet providing a hermetic seal over said silver flash layer, said polyester sheet having an opening formed therethrough; and
    a conductive bus covering a portion of said lens, said silver flash layer, and said polyester sheet, said conductive bus electrically coupling with said silver flash layer through said opening.

11. The conductive lens of claim 10 further comprising:
    a metal frame; and
    a conductive gasket, wherein said conductive gasket provides an electrical coupling between said conductive bus and said metal frame.

12. The conductive lens of claim 11 wherein said metal frame is aluminum diecast.

13. The conductive lens of claim 10 wherein the conductive bus is applied to all four sides of said lens.

14. The conductive lens of claim 11 wherein said conductive lens provides a conductive path from said metal frame through said conductive gasket and over said silver flash layer thereby making said conductive lens opaque to electromagnetic interference (EMI).

15. The conductive lens of claim 14 wherein said conductive lens is optically transparent.

16. The conductive lens of claim 10 wherein said opening comprises a notch cut from said polyester sheet.

17. A method for a conductive lens comprising:
    applying a silver coated film to one side of a lens;
    applying a polyester sheet over said silver flash layer to provide a hermetic seal;
    utilizing openings that extend through said polyester sheet to expose an edge portion of said silver flash layer; and
    applying a conductive bus layer around the edges of said lens, said conductive bus layer providing an electrical coupling between said silver flash layer and a metal frame through said openings, said electrical coupling producing an electromagnetic interference (EMI) shield on said visually transparent conductive lens.

18. The method as recited in claim 17 wherein said openings in said polyester sheet are formed prior to applying said polyester sheet over said silver flash layer.

19. The method as recited in claim 17 wherein said polyester sheet is applied over said silver flash layer with a high temperature adhesive which tolerates temperatures up to 70° C.

20. The method as recited in claim 17 wherein said conductive bus layer is a printed on silver ink screen.

21. The method as recited in claim 17 wherein said openings in said polyester sheet are rectangular.

22. The method as recited in claim 17 wherein said openings in said polyester sheet are circular.

23. The method as recited in claim 17 wherein said polyester sheet is 3 to 5 millimeters thick.

* * * * *